3,586,702
ZEARALENONE DERIVATIVES
Thomas B. Windholz, Westfield, and Ronald D. Brown, Cranford, N.J., assignors to Merck & Co., Inc., Rahway, N.J.
No Drawing. Filed Feb. 27, 1969, Ser. No. 803,047
Int. Cl. C07d 9/00
U.S. Cl. 260—343.2F
10 Claims

ABSTRACT OF THE DISCLOSURE

6'-chloroethynyl-carbinol derivatives of the compound, zearalenone, which display estrogenic and anabolic activity are prepared from zearalenone by the chloroethynylation of the 4-monotetrahydropyranyl ether derivative thereof.

---

This invention relates to compositions of matter classifiable in the field of organic chemistry as chloroethynyl-carbinol derivatives of zearalenone, 6-(10 - hydroxy-6'-oxo-trans-1-undecenyl)-β-resorcylic acid-μ-lactone. More particularly, this invention relates to 6'-chloroethynyl-carbinol derivatives of zearalenone and to 2-mono-, 4-mono- and 2,4-diether and to 2-mono-, 4-mono- and 2,4-diester derivatives thereof; to methods of preparing such compounds and to the use of such compounds as estrogenic and anabolic agents.

The novel compounds of this invention may be represented by the following structural formula:

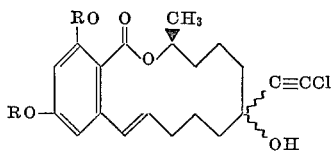

wherein R is a member selected from the group consisting of hydrogen, loweralkyl, loweralkanoyl, aralkyl and benzoyl. It will be appreciated by those skilled in the art that the carbon atom at the 6'-position in the above formula is asymmetric and that there are, therefore, two diastereoisomers of the compounds of this invention.

The instant invention is based upon applicants' discovery that the 6'-chloroethynyl derivatives of zearalenone described above display valuable anabolic and estrogenic activity. It is contemplated that dosage units containing these compounds as the essential active ingredient will be administered either orally or parenterally to animals to achieve an anabolic and estrogenic response such as increasing the rate of growth of meat producing animals.

As used herein, the terms, loweralkyl and loweralkanoyl, are intended to include both straight and branched-chain loweralkyl and loweralkanoyl groups having from 1 to 6 carbon atoms in the alkyl moiety. Typical of such groups are, for example, methyl, ethyl, propyl, isopropyl, n-hexyl, formyl, acetyl, isopropionyl, n-butyryl, and the like. The preferred aralkyl group is benzyl.

Applicants have found that the novel 6'-chloroethynyl-carbinol derivatives of zearalenone of this invention may be prepared readily by the chloroethynylation of the 4-tetrahydropyranyl ether derivative of zearalenone. The 4-tetrahydropyranyl ether derivative of zearalenone is employed as the starting material since it is desirable to protect the labile 4-hydroxy group of the zearalenone molecule from attack during the chloroethynylation reaction. Although protecting groups other than the tetrahydropyranyl ester group, such as, for example, loweralkyl ethers or loweralkanoyl esters, can be used, applicants prefer the tetrahydropyranyl ester group since it permits substantially quantitative chloroethynylation under normal conditions.

Conveniently, zearalenone 4-tetrahydropyranyl ether may be prepared by suspending zearalenone in commercial dihydropyran and stirring the resulting mixture, preferably in the presence of an acidic catalyst, at about room temperature for about 24 to 72 hours. Higher reaction temperatures with shortened reaction times may be employed if desired. Precipitated zearalenone 4-tetrahydropyranyl ether may be separated from the reaction mixture by filtration and purified by recrystallization from a suitable organic solvent. Additional zearalenone 4-tetrahydropyranyl ether may be recovered from the reaction mixture pouring the filtered reaction mixture over ice, extracting the resulting mixture with a suitable organic solvent such as ethyl acetate, back-washing the extract with water and drying and concentrating the extract in vacuo. The residue may be purified by conventional recrystallization from a suitable organic solvent.

Chloroethynylation of the zearalenone 4-tetrahydropyranyl ether may be carried out by dropping a solution of the zearalenone ether into a freshly prepared chloroethynylation reaction media. This chloroethynylation reaction media may be prepared by mixing at about 0° C. and under an inert atmosphere, such as ntrogen, 480 ml. of a commercial solution of methyl lithium and 1 liter of dry ether and adding dropwise thereto over a period of about 40 minutes a freshly prepared solution 90 ml. of cis-dichloroethylene in 500 ml. of dry ether. The mixture is warmed to about 20° C. and is allowed to age at this temperature for about 2 hours. At this point, a solution of the zearalenone ether in a dry organic solvent such as ether, benzene or tetrahydrofuran is added and the reaction mixture is stirred at about room temperature for 1 to 4 hours. Zearalene 4-tetrahydropyranyl ether-6'-chloroethynylcarbinol may be recovered from the reaction mixture by pouring the reaction mixture over ice, extracting the resulting mixture with ether and concentrating the resulting extract to dryness. The crude material may be purified by conventional recrystallization techniques.

In order to obtain the desired zearalene 6'-chloroethynyl-carbinol it is necessary now only to remove the protecting tetrahydropyranyl ether group from the 4-position of the compound as prepared above. This may be accomplished by simple acid hydrolysis of the zearalene 4-tetrahydroyranyl ether-6'-chloroethynyl-carbinol. This hydrolysis may be carried out, for example, by treating a solution of the zearalene 4-tetrahydropyranyl ether-6'-chloroethynyl-carbinol in a suitable organic solvent, such as methanol, with a mild acid, such as p-toluenesulfonic acid and stirring the mixture at about room temperature for 4–12 hours. Desirably, the reaction is carried out under an inert atmosphere such as nitrogen. The zearalenone 6'-chloroethynyl-carbinol so produced may be recovered from the reaction mixture by pouring the reaction mixture over ice, drying, concentrating and recrystallizing in the conventional manner.

Preparation of those zearalene 6'-chloroethynyl-carbinols of this invention which have an alkoxy or aralkoxy group at the 2- and 4-positions may be achieved readily according to techniques already fully described in the art by treating zearalene 6'-chloroethynyl-carbinol with a dialkyl- or diaralkyl sulfate in an aqueous basic medium. Thus, for example, zearalene 6'-chloroethynyl-carbinol in aqueous sodium hydroxide may be treated with dimethyl sulfate to prepare 2,4-dimethoxyzearalene 6'-chloroethynyl-carbinol. The reaction may be carried out at temperatures ranging from about 15° C. to about room temperature and is usually complete in about 30 minutes to 2 hours. The precipitated diether is recovered by filtration and is purified by recrystallization in the conventional manner.

It has been found also that upon acidification of the filtered reaction mixture obtained above, there is obtained a second precipitated product which may be recovered by filtration and purified in the usual way. This second product is the 2-monoalkyl (or 2-monoaralkyl) ether of zearalene 6'-chloroethynyl-carbinol. The reaction described above, therefore, affords a route to both the 2,4-diethers and 2-monoethers of zearalene 6'-chloroethynyl-carbinol; it being understood that in order to prepare any particular 2,4-diether or 2-monoether it is necessary merely to employ the appropriate dialkyl or diaralkyl sulfate as the alkylating reagent.

The zearalene 6'-chloroethynyl-carbinols of this invention having a 4-monoalkyl ether or a 4-monoaralkyl ether group conveniently are prepared from the corresponding 2,4-diether by selective hydrolysis. This may be effected by treating the diether in a suitable organic solvent such as methylene chloride with ether boron tribromide or boron trichloride at about $-10$ to about $-15°$ C., preferably under an inert atmosphere such as nitrogen. The hydrolysis of the ether radical at the 2-position is essentially instantaneous and, accordingly, the diether is contacted only momentarily with the boron trihalide, i.e. preferably for less than one minute. The 4-monoether is isolated by removal of the solvent and recrystallization from a suitable organic solvent such as nitromethane.

Zearalene 6'-chloroethynyl-carbinols of this invention having a loweralkanoyloxy or benzoyloxy substituent at the 2- and 4-positions may be prepared by subjecting zearalene 6'-chloroethynyl-carbinol to the action of an acylating agent. Conveniently, the acylation is carried out by treating the cholorethynyl-carbinol, dissolved in a suitable organic solvent such as pyridine, with an acid anhydride. Thus a pyridine solution of zearalene 6'-chloroethynyl may be treated with acetic anhydride in order to obtain 2,4-diacetoxyzearalene 6'-chloroethynyl-carbinol. The reaction may be carried out at room temperature and usually is complete in 4–12 hours. The diester may be recovered from the reaction mixture by pouring the reaction mixture over ice, extracting the resulting mixture with ether, drying the extract and conventional recrystallization. It will be understood that it is necessary merely to select the appropriate acid anhydride as the acylating agent in order to prepare any of the diesters of this invention.

Those zearalene 6'-chloroethynyl-carbinols of this invention having a monoloweralkanoyl of a monobenzoyl ester grouping at the 2- or 4-positions may be prepared by subjecting a 2-monoether or 4-monoether derivative of zearalene 6'-chloroethynyl-carbinol to acylation according to the technique described above in order to prepare the corresponding 2-monoether-4-ester or 2-ester-4-monoether derivative. These mixed ether-ester derivatives which also are included within the scope of this invention then may be subjected to boron trihalide hydrolysis as described above in order to obtain the desired 2- or 4-monoester derivative.

Mixed 2,4-diether and 2,4-diester derivatives of zearalene 6'-chloroethynyl-carbinol are readily prepared from a 2- or 4-monoether or from a 2- or 4-monoester by the etherification or esterification techniques described above. Thus, for example, zearalene 6'-chloroethyl-carbinol-2-methyl ether-4-ethyl ether may be prepared by treating zearalene 6'-chloroethynyl-carbinol-2-methyl ether with diethylsulfate and zearalene 6'-chloroethynyl-carbinol-2-acetate-4-propionate may be prepared by treating zearalene 6'-chloroethynyl-carbinol-2-acetate with propionic anhydride according to the techniques already fully described.

As pointed out above, the novel 6'-chloroethynylcarbinol derivatives of zearalenone of this invention display valuable anabolic and estrogenic activity and may be used to achieve an anabolic and estrogenic response such as increasing the rate of growth of meat producing animals. These compounds can be administered to animals by any suitable method including oral and parenteral administration. They may be blended with ordinary animal feeds containing the usual nutritionally-balanced diet of carbohydrates, proteins, vitamins and minerals in an amount sufficient to produce the desired rate of growth and thus can be fed directly to the animals. Also, if desired, the compounds of this invention may be suspended in a suitable injectable suspension medium and injected parenterally. The amount of compound administered to the animal, of course, will vary depending upon the animal and the desired rate of growth. Usually, administration of from about 5 to about 100 mg. per animal per day results in significantly increased growth rate.

The best mode contemplated by applicants for carrying out their invention is set forth in the following examples, it being understood that the examples are included for purposes of illustration merely.

EXAMPLE 1

Zearalenone 4-tetrahydropyranyl ether

Suspend 100 gm. of zearalenone in 100 ml. of dihydropyran and add 1 ml. of concentrated hydrochloric acid. Stir the mixture at room temperature for 4 hrs. and add another 100 ml. of dihydropyran. Continue stirring for an additional 70 hrs. at room temperature. Separate the precipitated solid by filtration and purify by recrystallization from 650 ml. of ethanol to obtain zearalenone 4-tetrahydropyranyl ether. (M.P. 158–160° C.).

To obtain an additional crop of zearalenone 4-tetrahydropyranyl ether, pour the filtrate obtained above over excess ice-sodium bicarbonate mixture and extract with 200 ml. of ethyl acetate. Wash the extract with water, dry and evaporate to dryness in vacuo. Purify the residue by recrystallization from ethanol.

EXAMPLE 2

Zearalene 4-tetrahydropyranyl ether-6'-chloroethynyl-carbinol

Add to 1000 ml. of dry ether at 0° C. under a nitrogen atmosphere 480 ml. of a commercial solution of methyl lithium (5.2%). Over a period of 40 mins., add dropwise a freshly prepared solution of 90 ml. of cis-dichloroethylene in 500 ml. of dry ether. Warm the mixture to 20° C. and age for 2 hrs. Add a solution of 30 gm. of 3 zearalenone 4-tetrahydropyranyl ether in a mixture of 500 ml. of dry benzene and 500 ml. of dry ether over a period of 3 mins. and stir at room temperature for 3 hrs. Pour the reaction mixture over ice and extract with 500 ml. of ether. Dry the ether extract over magnesium sulfate and concentrate to dryness. Purify by recrystallization from methanol to obtain zearalene 4-tetrahydropyranyl ether-6'-chloroethynyl-carbinol.

EXAMPLE 3

Zearalene 6'-chloroethynyl-carbinol

Dissolve 29 gm. of zearalene 4 - tetrahydropyranyl ether-6'-chloroethynyl-carbinol in 2000 ml. of methanol and add 12 gm. of p-toluenesulfonic acid. Stir under a nitrogen atmosphere at room temperature for 12 hrs. Pour the reaction mixture into 6000 ml. of ice water and extract with 2000 ml. of ether. Dry the ether extract and concentrate to dryness. Recrystallize from 50% ether/hexane to obtain zearalene 6'-chloroethynyl-carbinol.

EXAMPLE 4

Zearalene 2,4-dimethyl ether-6'-chloroethynyl-carbinol

Add 5 ml. of dimethyl sulfate to a solution of 2 gm. of zearalene 6'-chloroethynyl-carbinol in 80 ml. of 10% sodium hydroxide and 20 ml. of water. Stir the mixture for 30 mins. at 20° C. and add an additional 5 ml. of dimethyl sulfate. Stir for an additional 90 mins. at 25° C. Separate the solid precipitate by filtration, wash with water and dry. Purify by recrystallization from ethanol to obtain zearalene 2,4 - dimethylether-6'-chloroethynyl-carbinol.

By substituting an equivalent quantity of a dialkyl or a diaralkyl sulfate such as, for example, diethyl sulfate, diisopropyl sulfate, diamyl sulfate, dihexylsulfate and dibenzyl sulfate for the dimethyl sulfate employed in the process described above, the corresponding 2,4-diethyl, 2,4-diisopropyl, 2,4-diamyl, 2,4-dihexyl and 2,4-dibenzyl ether derivatives of zearalene 6'-chloroethynyl-carbinol can be prepared.

EXAMPLE 5

Zearalene 2-methyl ether-6'-chloroethynyl-carbinol

Acidify the filtrate obtained after the separation of the precipitate from the reaction mixture of Example 4 with 25 ml. of 12 N sulfuric acid. Separate the precipitate by filtration, wash with water and dry. Purify by recrystallization from a mixture of ethanol and water to obtain zearalene 2-methyl ether-6′-chloroethynyl-carbinol.

EXAMPLE 6

Zearalene 4-benzyl ether-6′-chloroethynyl-carbinol

To a stirred solution of 480 mg. of zearalene 2,4-dibenzyl ether-6′-chloroethynyl-carbinol in 5 ml. of methylene chloride under a nitrogen atmosphere at 0° C., add a cold solution of 2 ml. of boron tribromide in 2 ml. of methylene chloride. Pour the reaction mixture immediately onto 50 ml. of crushed ice with stirring. Make the reaction mixture basic with potassium bicarbonate and extract with methylene chloride. Wash the extract with saturated brine, dry over magnesium sulfate and concentrate to dryness in vacuo. Purify by recrystallization from nitromethane to obtain zearalene 4-benzyl ether-6′-chloroethynyl-carbinol.

By substituting zearalene 6′-chloroethynylcarbinol-2,4-dialkyl (or diaralkyl) ethers such as, for example, the 2,4-dimethyl, 2,4-diethyl,2,4-dibutyl and 2,4-dihexyl ethers for the dibenzyl ether employed above, the corresponding 4-methyl, 4-ethyl, 4-butyl and 4-hexyl ether derivatives of zearalene 6′-chloroethynyl-carbinol can be prepared.

EXAMPLE 7

Zearalene 6′-chloroethynyl-carbinol-2,4-diacetate

Dissolve 24 gm. of zearalene 6′-chloroethynylcarbinol in 150 ml. of pyridine and add 14.4 ml. of acetic anhydride. Stir for 12 hrs. at room temperature. Pour the reaction mixture into 1000 ml. of ice water and extract with 500 ml. of ether. Wash the ether extract with dilute hydrochloric acid and with water. Dry the washed extract over magnesium sulfate and concentrate to dryness. Recrystalliaze from ethanol to obtain zearalene 6′-chloroethynylcarbinol-2,4-diacetate.

By substituting an alkanoyl or aralkenoyl anhydride such as, for example, propionic anhydride, butyric anhydride, hexanoic anhydride and benzoic anhydride for the acetic anhydride employed in the above process, the corresponding 2,4-dipropionate, 2,4-dibutyrate, 2,4-dihexanoate and 2,4-dibenzoate ester derivatives of zearalene 6′-chloroethynylcarbinol can be prepared.

EXAMPLE 8

Zearalene 6′-chloroethynyl-carbinol-2-methyl ether-4-acetate

Dissolve 12 gm. of zearalene-2-methyl ether-6′-chloroethynyl-carbinol in 80 ml. of pyridine and add 8 ml. of acetic anhydride. Stir for 12 hrs. at room temperature. Pour the reaction mixture into 500 ml. of ice water and extract with 500 ml. of ether. Wash the ether extract with dilute hydrochloric acid and with water. Dry the ether extract over magnesium sulfate and concentrate to dryness. Recrystallize from ethanol to obtain zearalene 6′-chloroethynyl-carbinol-2-methylether-4-acetate.

EXAMPLE 9

Zearalene 6′-chloroethynyl-carbinol-4-ethyl ether-2-benzoate

Repeat the process of Example 8 substituting an equivalent quantity of zearalene 4-ethyl ether-6′-chloroethynyl-carbinol for the zearalene 2-methyl ether-6′-chloroethynyl-carbinol and an equivalent quantity of benzoic anhydride for the acetic anhydride to obtain zearalene 6′-chloroethynyl-carbinol-4-ethyl ether-2-benzoate.

EXAMPLE 10

Zearalene 6′-chloroethynyl-carbinol-4-acetate

To a stirred solution of 500 mg. of 2-methoxyzearalene 6′-chloroethynyl-carbinol-4-acetate in 7 ml. of methylene chloride under nitrogen at 0° C., add a cold solution of 2 ml. of boron tribromide in 2 ml. of methylene chloride. Pour the reaction mixture immediately onto 50 ml. of crushed ice with stirring. Make the reaction mixture basic with potassium bicarbonate and extract with methylene chloride. Wash the extract with saturated brine, dry over magnesium sulfate and concentrate to dryness in vacuo. Purify by recrystallization from nitromethane to obtain zearalene 6′-chloroethynyl-carbinol-4-acetate.

EXAMPLE 11

Zearalene 6′-chloroethynyl-carbinol-2-benzoate

Repeat the process of Example 10 substituting an equivalent quantity of 4-ethoxyzearalene 6′-chloroethynyl-carbinol-2-benzoate for the 2-methoxyzearalene 6′-chloroethynyl-carbinol-4-acetate to obtain zearalene 6′-chloroethynyl-carbinol-2-benzoate.

EXAMPLE 12

Zearalene 6′-chloroethynyl-carbinol-2-methyl ether-4-ethyl ether

To a solution of 2 gm. of zearalene 6′-chloroethynyl-carbinol-2-methyl ether in 80 ml. of 10% potassium hydroxide and 20 ml. of water, add 5 ml. of diethyl sulfate. Stir the mixture for 30 mins. at 20° C. and allow the mixture to warm to 25° C. with continued stirring for an additional 90 mins. Separate the precipitate by filtration, wash with water and dry. Recrystallize from ethanol to obtain zearalene 6′-chloroethynyl-carbinol-2-methyl 4-ethyl ether.

EXAMPLE 13

Zearalene 6′-chloroethynyl-carbinol-2-acetate-4-propionate

Dissolve 6 gm. of zearalene 6′-chloroethynyl-carbinol-2-acetate in 40 ml. of pyridine and add 4 ml. of propionic anhydride. Stir for 12 hrs. at room temperature. Pour the reaction mixture into 250 ml. of ice water and extract with 300 ml of ether. Wash the ether extract with dilute hydrochloric acid and with water. Dry the washed extract over magnesium sulfate and concentrate to dryness. Recrystallize from methanol to obtain zearalene 6′-chloroethyl-carbinol-2-acetate-4-propionate.

Although applicants have described their invention above with reference to particular embodiments, many modifications will suggest themselves to those skilled in the art from a study of the foregoing description. Applicants consider all such modifications to be the full equivalent of the embodiments specifically described and to fall within the scope of their invention.

The subject matter which applicants regard as their invention is particularly pointed out and distinctly claimed as follows.

What is claimed is:
1. A compound having the formula:

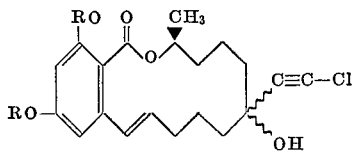

wherein R is a member selected from the group consisting of hydrogen, loweralkyl, loweralkanoyl, benzyl and benzoyl.

2. A compound of claim 1 wherein R is loweralkyl.
3. A compound of claim 1 wherein R is loweralkanoyl.
4. The compound of claim 1 wherein R is hydrogen.
5. The compound of claim 1 wherein R is methyl.
6. The compound of claim 1 wherein R is acetyl.
7. The compound of claim 1 wherein R is benzyl.
8. The compound of claim 1 wherein R is benzoyl.
9. The process for preparing zearalene 6'-chloroethynyl-carbinol which comprises suspending a compound of the formula:

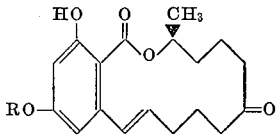

wherein R is a member of the group consisting of lower alkyl, loweralkanoyl and tetrahydropyranyl in a reaction medium comprising a solution of cis-dichloroethylene and methyl lithium in a dry organic solvent.

10. The process of claim 9 wherein R is tetrahydropyranyl.

References Cited
UNITED STATES PATENTS 3,373,034   3/1968   Hodge et al. _____ 260—343.2X JOHN M. FORD, Primary Examiner U.S. Cl. X.R.

260—999